United States Patent Office 3,574,191
Patented Apr. 6, 1971

3,574,191
METHOD FOR THE PRODUCTION OF 1,3,4,5-TETRAHYDRO - 1,4-BENZODIAZEPINE DERIVATIVES
Pasquale Domenico Sorrentino, Kastrup, Denmark, assignor to A/S Dumex (Dumex Ltd.), Copenhagen, Denmark
No Drawing. Continuation-in-part of applications Ser. No. 683,106, Nov. 15, 1967, and Ser. No. 709,864, Mar. 4, 1968. This application Jan. 26, 1970, Ser. No. 5,911
Int. Cl. C07d 41/00, 41/06, 53/00
U.S. Cl. 260—239.3    1 Claim

ABSTRACT OF THE DISCLOSURE 1,3,4,5-tetrahydro - 5 - phenyl - 2H - 1,4-benzodiazepin-2-ones are produced by reacting correspondingly substituted 2-amino-benzhydryl phthalimides with a halogenacetyl halide to transform the amino group into a halogenacetylimide group, establishing closure of the diazepine ring by refluxing with an alkali carbonate solution and cleaving off the phthalic acid group with hydrogen bromide in glacial acetic acid solution.

---

This application is a continuation-in-part of copending applications Ser. No. 683,106, filed Nov. 15, 1967 now U.S. Pat. No. 3,523,116, and Ser. No. 709,864, filed Mar. 4, 1968. now abandoned.

This invention relates to a new method of producing derivatives of 1,3,4,5-tetrahydro-2H-1-4-benzodiazepin-2-one of the general formula:

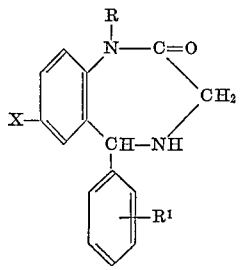

I wherein X represents hydrogen or halogen, R represents hydrogen or an alkyl group, and $R^1$ represents hydrogen, halogen, or an alkyl group, an alkoxy group, or a trifluoromethyl group, each of the R and $R^1$ groups, if carbon containing, having maximum 6 carbon atoms.

The compounds of Formula I are known compounds with therapeutically valuable effects and are, moreover, suitable intermediates for the production of also known therapeutically active 1,3-dihydro-2H-1,4-benzodiazepin-2-one derivatives.

The method according to the invention is characterized in that derivatives of 2-amino-benzhydryl phthalimide of the general formula;

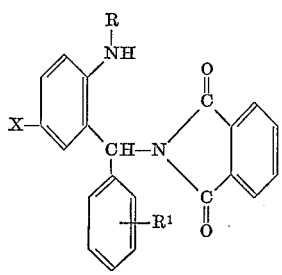

II wherein X, R, and $R^1$ are as hereinbefore defined, are reacted with a halogenacetyl halide, according to Schotten-Baumann, the resulting product of the general formula:

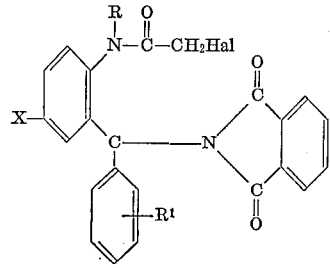

III wherein X, R, and $R^1$ are as hereinbefore defined, and Hal represents a halogen atom, being refluxed with an aqueous solution of an alkali carbonate to form a compound of the general formula:

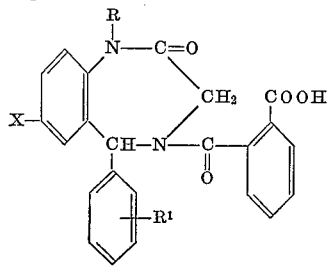

IV wherein X, R, and $R^1$ are as hereinbefore defined, after which the phthalic acid group is removed by a treatment with hydrogen bromide in glacial acetic acid.

The starting material of formula II can be produced by reacting the corresponding aminobenzhydryl amines, e.g. 2 - methylamino-5-chlorobenzhydryl amine, with phthalic acid anhydride, or by reacting the corresponding aminobenzhydryl chloride with potassium phthalimide, as taught in copending application Ser. No. 683,106, filed Nov. 15, 1967.

The method, which is more closely illustrated in the following by means of an example, is advantageous in giving good yields and easily purified products.

To produce the starting material, a mixture of 33 g. of 2-methylamino-5-chlorobenzhydryl amine and 19.8 g. of phthalic acid anhydride is heated to 180–185° C. for 15 minutes, after which the resulting melted mass is cooled, and recrystallized from ethanol, yielding 34.5 g. of 2-methylamino-5-chlorobenzhydryl phthalimide with melting point 191.2–191.9° C.

To a solution of 23 g. of 2-methylamino-5-chlorobenzhydryl phthalimide in 300 ml. of benzene are added 40 ml. of 2 N NaOH. The mixture is cooled to 10° C., and a solution of 15.8 g. of bromoacetyl bromide in 40 ml. of benzene is added with stirring. During the addition the temperature is kept between 10° and 15° C. Afterwards the mixture is left at room temperature for one hour. Then the organic phase is separated, washed with water, dried over sodium sulphate, and concentrated to 100 ml. There are added 100 ml. of n-hexane with stirring, and the mixture is cooled to 10° for 2–3 hours. The thus precipitated crystals are filtered off, washed with n-hexane, and evaporated in vacuo at 40° C. The yield is 28.5 g. of fine white crystals of 2-(bromoacetyl-methylamino)-5-chloro-benzhydryl phthalimide with melting point 160–163° C.

25 g. of 2-(bromoacetyl-methylamino)-5-chloro-benzhydryl phthalimide and 7 g. of potassium carbonate in 200 ml. of water are refluxed for 20 hours. A clear yellow solution is obtained, which is cooled to 5–10° C. and acidified to Congo red with 1N HCl. The fine, white precipitate is filtered off, washed with water, and evaporated in vacuo over potassium chloride, yielding 18.5 g. of 1-methyl - 4 - phthalyl - 5 - phenyl-7-chloro,1,3,4,5-tetrahydro-2H-1,4-benzediazepin-2-one as a fine white powder with melting point 270° C. (dec.).

20 g. of 1-methyl-4-phthalyl-5-phenyl-7-chloro-1,3,4,5-tetrahydro-2H-1,4-benzodiazepin-2-one dissolved in 200 ml. of a 20% solution of HBr in glacial acetic acid are refluxed for 45 minutes. The mixture is cooled to room temperature and poured into 1 kg. of a mixture of water and ice.

The mixture is made alkaline with 2 N NaOH and extracted with two portions of 100 ml. of methylene chloride. The combined extracts are washed with water, dried over sodium sulphate, and evaporated to dryness.

The yield is 13 g. of crude 1-methyl-5-phenyl-7-chloro-1,3,4,5-tetrahydro-2H-1,4-benzodiazepin-2-one. Recrystallization from isopropanol gives the pure substance with melting point 143° C.

In similar manner 7-chloro-1,3,4-5-tetrahydro-5-phenyl-2H-1,4-benzodiazepin-2-one of M.P. 185–185.5° C., and 1,3,4,5-tetrahydro-5-phenyl-2H-1,4-benzodiazepin - 2 - one of M.P. 147–148° C. are produced.

I claim:
1. The method of producing compounds of the formula

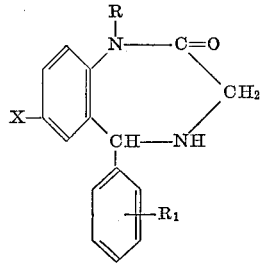

wherein X is hydrogen or halogen, R is hydrogen, or alkyl of less than seven carbon atoms, and $R^1$ is hydrogen, halogen, alkyl of less than seven carbon atoms, alkoxy of less than seven carbon atoms, or trifluoromethyl, which comprises reacting a compound of the formula

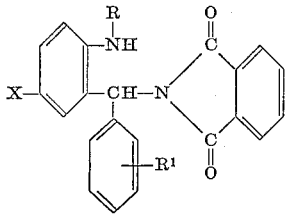

wherein X, R, and $R^1$ are as defined hereinabove, with a halogenacetyl halide according to Schotten-Baumann to yield a corresponding compound of the formula

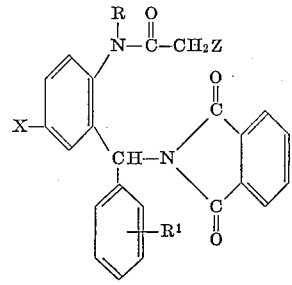

wherein X, R, and $R^1$ are as hereinbefore defined, and Z is halogen, which compound is then refluxed with an aqueous solution of an alkali carbonate to yield a corresponding compound of the formula

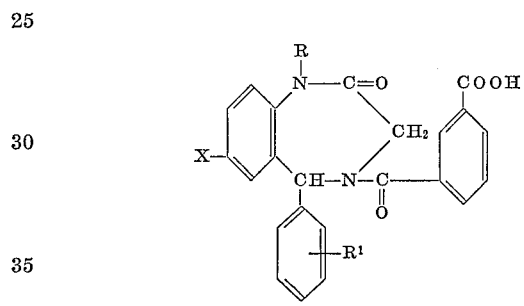

wherein X, R, and $R^1$ are as hereinbefore defined, which compound is then treated with hydrogen bromide in galcial acetic acid to yield the desired final product.

References Cited
UNITED STATES PATENTS
3,371,085   2/1968   Reeder et al. _____ 260—239.3

HENRY R. JILES, Primary Examiner

R. T. BOND, Assistant Examiner